United States Patent [19]
Cirlin et al.

[11] Patent Number: 5,561,298
[45] Date of Patent: Oct. 1, 1996

[54] DESTRUCTION OF CONTAMINANTS USING A LOW-ENERGY ELECTRON BEAM

[75] Inventors: Eun-Hee Cirlin; Weldon S. Williamson, both of Malibu; Franklin A. Dolezal, Reseda; Leroy J. Miller, West Hills; John J. Vajo, Calabasas; John D. Williams, Agoura Hills, all of Calif.

[73] Assignee: Hughes Aircraft Company, Los Angeles, Calif.

[21] Appl. No.: 195,663

[22] Filed: Feb. 9, 1994

[51] Int. Cl.⁶ .................................... G01N 23/00
[52] U.S. Cl. .................. 250/432 R; 250/435; 250/452.3
[58] Field of Search ................... 250/432 R, 435, 250/438, 492.3

[56] References Cited

U.S. PATENT DOCUMENTS

| | | | |
|---|---|---|---|
| 3,780,308 | 12/1973 | Nablo | 250/493.1 |
| 3,970,892 | 7/1976 | Wakalopulos. | |
| 4,025,818 | 5/1977 | Giguere et al.. | |
| 4,596,642 | 6/1986 | Higo | 204/157.3 |
| 4,915,916 | 4/1990 | Ito et al. | 250/435 |
| 4,943,356 | 7/1990 | Dietrich. | |
| 5,072,124 | 12/1991 | Kondo et al. | 250/435 |
| 5,175,436 | 12/1992 | Puumalainen | 250/492.3 |
| 5,256,854 | 10/1993 | Bromberg et al.. | |
| 5,378,898 | 1/1995 | Schonberg et al. | 250/492.3 |
| 5,457,269 | 10/1995 | Schonberg | 250/492.3 |

FOREIGN PATENT DOCUMENTS

| | | |
|---|---|---|
| 250866A1 | 5/1987 | European Pat. Off.. |
| 3625232A1 | 7/1986 | Germany. |
| 2173779 | 10/1986 | United Kingdom. |
| WO94/17899 | 8/1994 | WIPO. |
| WO94/26407 | 11/1994 | WIPO. |

OTHER PUBLICATIONS

"Microwave Electron-Tube Devices", S. Liao, Prentice-Hall, 1988, pp. 42–44.

"Full Scale Electron Beam Treatment of Hazardous Wastes-Effectiveness and Costs", C. N. Kurucz, et al. Presented at the 45th Annual Purdue University, Industrial Waste Conference, W. Layafayette, Indiana, May 8–10, 1990.

*Primary Examiner*—Bruce C. Anderson
*Attorney, Agent, or Firm*—V. D. Duraiswamy; W. K. Denson-Low

[57] ABSTRACT

Contaminant levels in a fluid such as air or water are reduced by producing a pulsed electron beam having an average primary electron energy of from about 90 to about 110 thousand electron volts (corresponding to an average injected electron energy of from about 45 to about 55 thousand electron volts in a preferred case) and directing the electron beam through the fluid. The contaminant compounds may include organic compounds and certain inorganic compounds such as $NO_x$ and $SO_x$. The fluid is preferably contained in a contaminant reduction cell that is separated from an electron beam source by an electron-transparent window.

20 Claims, 3 Drawing Sheets

DESTRUCTION OF CONTAMINANTS USING A LOW-ENERGY ELECTRON BEAM

BACKGROUND OF THE INVENTION

This invention relates to the reduction of contaminant levels in gases and liquids, and, more particularly, to the use of a low-energy electron beam to destroy contaminant compounds.

A variety of contaminants, sometimes also termed pollutants, are sometimes present in air and water at levels in the parts per million range. These contaminants include various active and inert organic compounds as well as inorganic compounds such as the nitrogen oxides termed $NO_x$ and the sulfur oxides termed $SO_x$. In some instances these contaminants have been proved harmful to life, crops, and buildings, and in other instances it is desirable to remove them from the environment for aesthetic reasons.

A wide variety of chemical and energetic techniques have been developed to reduce the levels of specific contaminant compounds. The chemical reaction techniques often themselves involve the use or production of other harmful substances. Typical destruction techniques generally involve exposing the contaminant to some type of energetic environment to modify the contaminant in some fashion.

In one approach, a high-energy beam of electrons is directed through a fluid containing a contaminant. The electron beam, having electrons with energies of about 0.3 to about 8 million electron volts (Mev), reduces the concentration of contaminants in the fluid. The reduction mechanism is thought to involve breaking of the internal chemical bonds of the contaminants to modify them to a less noxious form.

The present inventors have observed that the use of such high-energy electron beams has the significant drawback that extensive shielding of any decontamination apparatus is required. The high-energy electron beam is injurious to life, as are the Bremstrahlung and X-radiation that may be produced in such an apparatus. Consequently, such an apparatus must be large and bulky, because extensive shielding is required. The shielding also adds significantly to the cost of the apparatus, and limits its use in some situations of interest.

There is therefore a need for an improved approach for reducing contaminant levels in fluids. The present invention fulfills this need, and further provides related advantages.

SUMMARY OF THE INVENTION

The present invention provides a method and apparatus for reducing the contaminant levels in gases and liquids. The approach of the invention is operable to destroy various types of organic and inorganic contaminants. The apparatus is relatively compact, is relatively inexpensive, and does not require an excessive energy use. Further, it requires only minimal shielding for the safety of users.

In accordance with the invention, a method for reducing contaminants in a fluid comprises the steps of providing a fluid containing a contaminant compound, and producing a beam of electrons. The method further includes directing the beam of electrons through the fluid, preferably after passing through a thin window from the electron beam source into the fluid, to reduce the concentration of the contaminant in the fluid. The electrons of the beam have an average injected energy of from about 45 to about 55 thousand electron volts (kev) upon entering the fluid after passing through the window. The energy distribution of the electrons transmitted through the window and entering the fluid is a poisson-like distribution which depends on the window material and its thickness, and the primary electron energy. For the preferred case of the invention, the peak of the distribution is near 45–50 kev with a tail tending toward zero.

Further in accordance with the invention, a method for reducing contaminants in a fluid comprises the steps of providing an apparatus comprising an electron beam source of a beam of electrons with the electrons having a primary energy of from about 90 to about 110 thousand electron volts, a contaminant-reduction cell, and an electron-beam transmissive window between the electron beam source and the cell. The window is selected such that the average energy of the electrons is from about 45 to about 55 thousand electron volts after passing through the window, depending upon the material and thickness of the window. The method further includes producing an electron beam with the apparatus, introducing a fluid containing a contaminant compound into the cell, and passing the electron beam from the source, through the window, and through the cell containing the contaminant compound. The electron beam reduces the concentration of the contaminant compounds in the cell.

The approach of the invention utilizes a low-energy electron beam that requires only limited shielding. The low-energy electron beam source and its associated cell are less expensive and more compact than a high-energy system. The apparatus is therefore more suitable for utilization near persons, in a mobile form, and otherwise.

Using this approach, contaminants in the fluid are reduced after a relatively small amount of electron beam exposure. In the case of a pulsed electron beam, a small number of pulses is sufficient to reduce the contaminant levels to quite low levels.

The present invention provides an advance in the art of contaminant/pollutant reduction in fluids such as air and water, for a variety of types of such contaminants. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
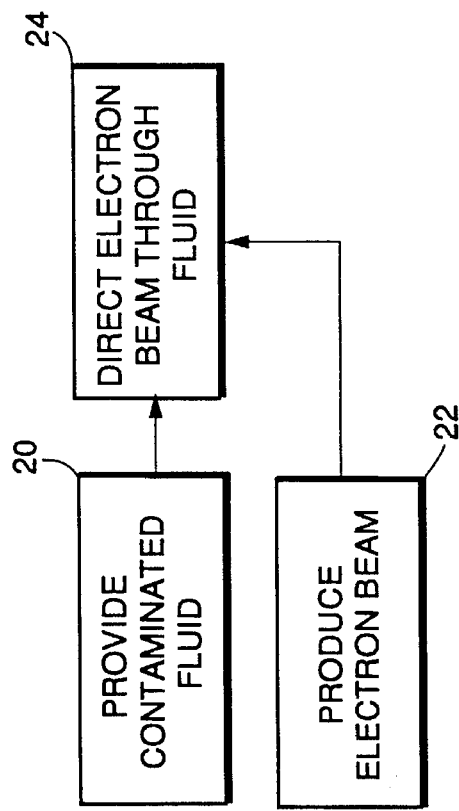
FIG. 1 is a flow diagram for the practice of the present invention.

FIG. 1 depicts the steps of a preferred approach to practicing the invention. A contaminated fluid such as air or water is provided, numeral 20. Organic contaminants of air that may be removed by destruction include, for example, VOCs (volatile organic compounds), benzene, trichloroethane, acetone, toluene, perchloroethylene, and other compounds. The term "organic" is interpreted broadly herein to include a broad range of compounds containing hydrogen, carbon, and other elements. "Organic" specifically includes, but is not limited to, modified hydrocarbons having simple and complex substituents such as, for example, chlorine. The concentrations of the contaminants are typically at least about 100 parts per million of the air. Inorganic contaminants of air that may be removed by destruction include, for example, nitrogen oxides of the $NO_x$ type and sulfuroxides of the $SO_x$ type. Organic contaminants of water that may be removed by destruction include, for example, polychlorinated biphenyl compounds, halogenated organic compounds, and mixture thereof. These listings of organic and inorganic compounds are meant to be illustrative and not exhaustive.

An electron beam is produced, numeral 22. The electron beam contains electrons having a primary energy (that is, the energy when produced) of from about 90 thousand electron volts ("keV") to about 110 thousand electron volts. Such a beam is typically produced by generating free electrons and accelerating the electrons through a potential of the indicated voltage. The electron energy bounds are defined on the lower end by the energy needed to traverse the vacuum interface foil (to be discussed subsequently in relation to FIG. 2) and on the higher end by the techniques and equipment used to produce the electron beam and by the required shielding. On the lower end, approximately one-half of the electrons with about one-half of their original energy pass through the foil, resulting in an average injected energy of from about 45 to about 55 kev. The percentage of the beam lost in the foil increases dramatically as the energy is lowered. A minimum primary beam of energy of about 90 keV is required for satisfactory commercial operation, although positive results can be obtained with somewhat lower energy. The average injected energy should not be less than about 45 kev for satisfactory commercial results, as less energetic beams generally cannot achieve sufficient contaminant reduction.

At the upper end, secondary x-rays and Bremstrahlung that are produced from higher energy electron beams are highly energetic and require increased shielding. In the range of 100 to 300 keV the shielding requirement increases by about an order of magnitude. Also, the equipment used to make the electron guns generally changes dramatically as the voltage exceeds about 300 keV. A maximum primary beam energy of about 110 keV has been selected as representing an acceptable compromise between obtaining sufficiently energetic primary beam and avoiding excessive shielding and other negative aspects of higher-energy electron beams.

The electron beam can be either pulsed or continuous wave (CW). Generally, the beam is pulsed for reasons of practicality. The electron gun operates at a relatively low pressure, as for example about 15 mTorr, and must be separated from the outside atmospheric pressure by a solid barrier or foil window. The electron gun may operate at elevated temperatures and at high vacuums, as well. The electrons must pass through the foil window as they leave the electron gun. As the electrons traverse the foil window, they lose some of their energy, which is dissipated as heat in the foil. This energy must be conducted away by either the support structure or the fluid medium outside the foil. The pulse width is set so that the rate of energy deposition in the foil window is lower than that required to cause window failure from excessive heating. Improved windows, window support cooling, or increased fluid medium cooling can increase the pulse length capabilities, which in turn would increase the allowed flow rate of contaminated fluid through the system.

In the pulsed operation as practiced by the inventors, the electron beam is pulsed from a fully off-state to a fully on-state in a succession of pulses. In this operation, it is preferred that each pulse last from about 5 to about 50 microseconds. The pulse duration and repetition rate are determined by the particular foil material, the foil support structure, and any cooling which may be present.

The electron beam is directed through the fluid, numeral 24. The electron beam is usually produced in a vacuum or a plasma, and is passed through a window to the fluid. Some particular apparatus has been developed for this procedure, but the method of the invention is not limited to use with this particular apparatus.

Figure 2:
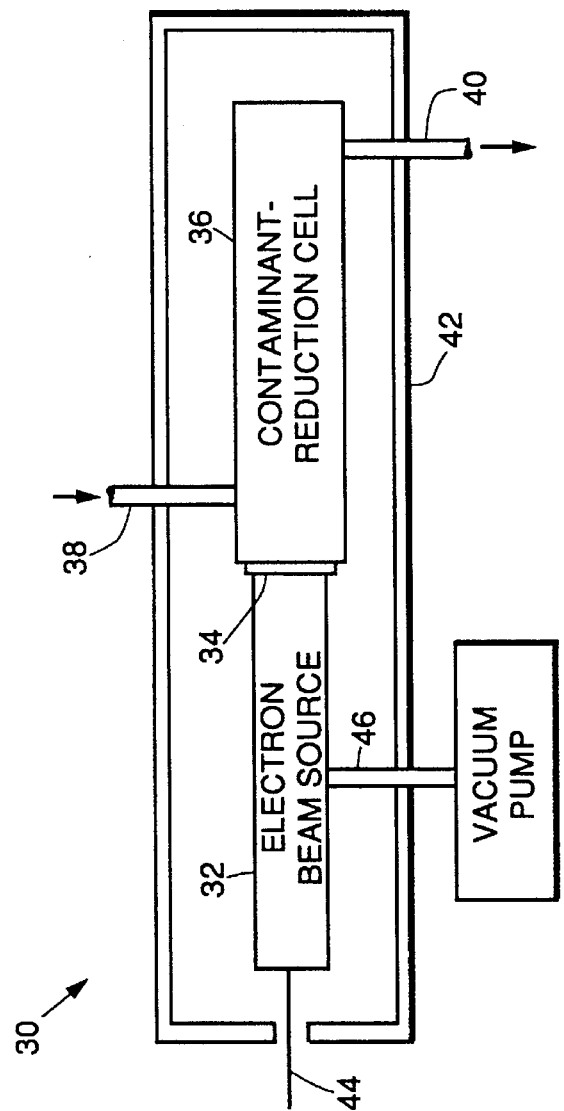
FIG. 2 is a schematic view of one embodiment of an apparatus for practicing the invention.

FIG. 2 illustrates an apparatus 30 operable to accomplish the method of the invention. The apparatus includes an electron beam source 32 that produces an electron beam with electrons having energy in the range of from a about 90 keV to about 110 keV. Such electron beam sources 32 are well known in the art for use in other applications. A description of such a source is found in S. Liao, "Microwave Electron Tube Devices", Prentice-Hall, 1988, page 42, which description is incorporated herein by reference. The cost of such a low-energy electron beam source is less than 10 percent of the cost of a high-energy electron beam source in the 0.3 to 8.0 million electron volt (MeV) range of comparable beam current.

The electron beam is produced in a partial vacuum, and the beam passes out of the source 32 through an electron-transmissive window 34. An operable window 34 is a piece of titanium foil about 13 micrometers thick.

As noted previously, the electron beam loses energy as it passes through the window 34. The energy of the electron beam as it leaves the window 34, termed the "injected energy", is distributed about an average of about 45 to about 55 keV.

After the electron beam passes out of the source 32 and through the window 34, it enters a contaminant-reduction cell 36. The cell 36 comprises a chamber with a fluid inlet 38 and a fluid outlet 40. Contaminated fluid flows into the cell through the inlet 38, and decontaminated fluid flows out of the cell through the outlet 40. The cell 36 may be operated either in a continuous flow fashion or a batch fashion. In the latter case, only a single inlet/outlet would be required.

Within the cell 36, the electron beam reacts with the contaminants in the fluid, causing their destruction and a resulting reduction in the contaminant level of the fluid. The operability of the invention has been demonstrated, and its operability does not depend upon any particular mode of reaction. However, by way of a possible explanation it is believed that the energetic electrons of the electron beam break the chemical bonds of the contaminants, which have chemical binding energies of less than 10 electron volts. The bonds of the resulting fragments are further broken, until eventually the resulting fragments are no longer injurious.

The electron beam source 32 and the contaminant-reduction cell 36 are surrounded by shielding 42, preferably in the form of a lead shield about ⅛ inch thick. The inlet 98 and outlet 40 pass through openings in the shielding 42, as does a power lead 44 and a vacuum line 45 for the electron beam source. This thickness of shielding is sufficient to avoid injury to persons or damage to instrumentation located in the vicinity of the apparatus 30. By comparison, a fluid decontamination system using electrons of from about 0.3 to about 8.0 MeV requires concrete shielding that is typically several feet thick.

Figure 3:
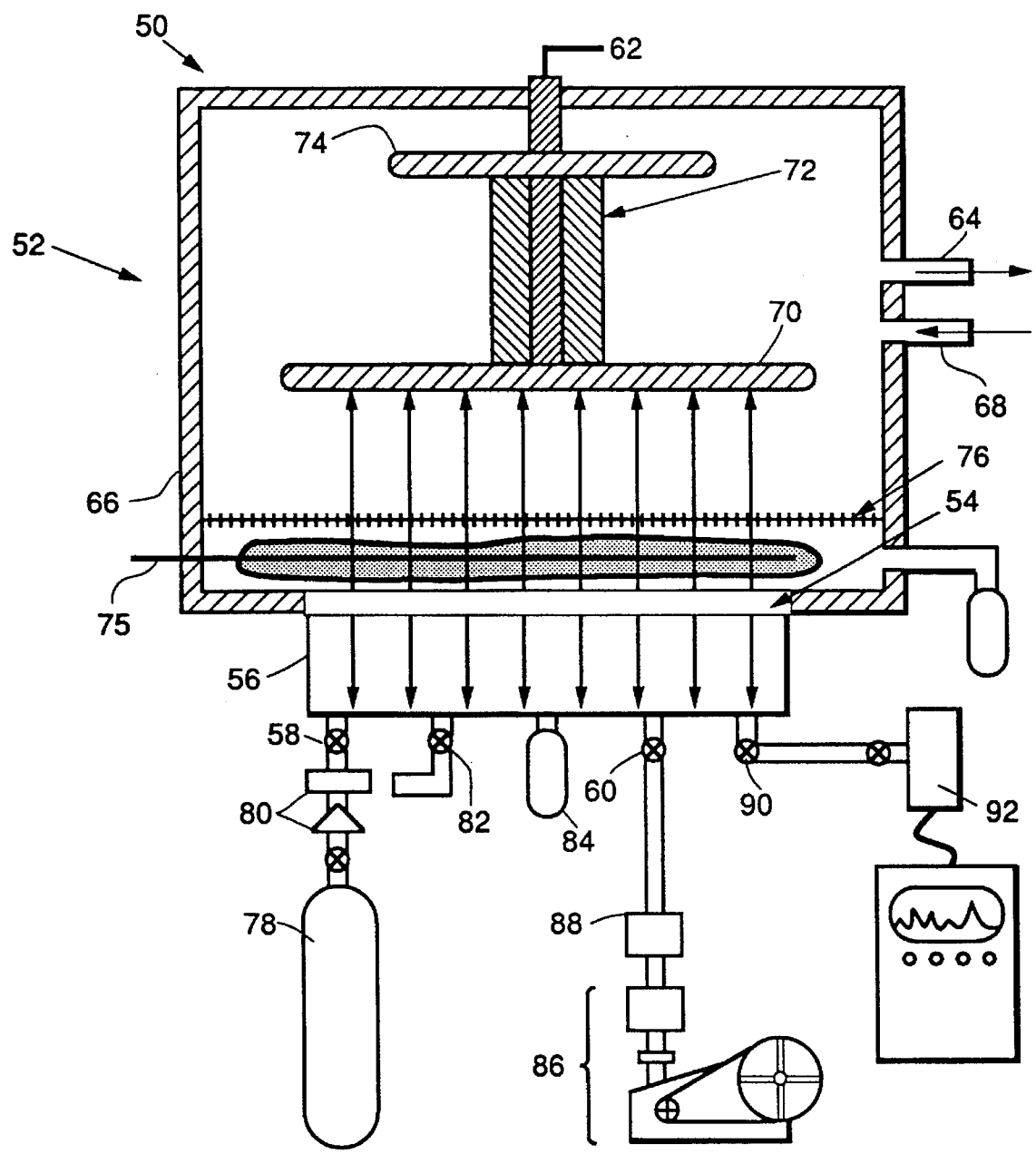
FIG. 3 is a schematic view of another embodiment of an apparatus for practicing the invention.

FIG. 3 depicts another embodiment of an apparatus 50 for practicing the method of the invention. This apparatus was constructed using an available electron beam source of the type described in U.S. Pat. Nos. 3,970,892 and 4,025,818, whose disclosures are incorporated by reference. This apparatus was used for experimental verification of the operability of the invention, as will be described subsequently.

The apparatus 50 includes an electron beam source 52, a window 54, a contaminant-reduction cell 56, an inlet 58 to the cell 56, an outlet 60 from the cell 56, about ⅛ of lead shielding or its equivalent (not shown in FIG. 3) around the electron beam source, window, and cell, a power lead 62 to the electron beam source 52, and a vacuum line 64 to the electron beam source 52.

The electron beam source 52 operates by producing secondary electrons and accelerating those secondary electrons for injection into the contaminant-reduction cell 56. A vacuum chamber 66 is evacuated through the vacuum line 64, and a small partial pressure, such as about 15 mTorr, of an ionizing gas such as helium gas is admitted to the vacuum chamber 66 through a backfill line 68. A negative dc voltage corresponding to the desired electron energy is applied to a cathode 70 through the power lead 62 passing through an insulating high-voltage bushing 72. A corona shield 74 is placed over the end of the bushing 72.

A wire 75 is positioned between the electron beam source 52 and the window 54. A grounded wire-mesh anode 76 is placed between the electron beam source 52 and the wire 75. The electron-beam pulse is initiated by applying a negative pulse of about 5 kev to the wire 75. This pulse produces a weakly ionized plasma in the space between the screen 76 and the window 54. The applied cathode voltage causes ions of the ionized gas in the plasma region to be accelerated toward the cathode 70 and to impact the cathode. The impacting ions generate secondary electrons, typically on the order of about 10–15 secondary electrons per ion. The secondary electrons are repelled by the negatively biased cathode 70 and pass through the grounded wire-mesh anode 76. The potential difference between the cathode 70 and the anode 75 establishes the energy of the electrons, and this potential difference is that of the cathode inasmuch as the anode is grounded.

The accelerated electrons pass through the window 54, which, is preferably a titanium sheet about 13 micrometers thick, and enter the cell 56. In the cell 56, the electrons interact with the contaminated fluid admitted through the inlet 58. Decontaminated fluid is removed from the outlet 60.

The apparatus 50 was constructed as a scientific test tool to conduct studies to measure the effectiveness of the method of the invention, and therefore it is provided with features and instrumentation not normally required for the operability of the invention. In the illustration of FIG. 3, the contaminated fluid is air with specifically determined amounts of contaminants. The contaminated air is provided in a gas cylinder 78 and metered through a flow control mechanism 80. There is a separate purge valve 82 to the cell 56. Pressure within the cell is measured by a thermocouple vacuum gauge 84. The cell 56 can be completely evacuated through the outlet 60 by a vacuum pump/filter system 85 and associated cold trap 88. The composition of the gas in the interior of the cell 56 can be sampled through a sampling valve 90 that leads to a quadrupole mass analyzer 92.

The apparatus 50 of FIG. 9 was used to determine the operability of the invention. The electron beam source was operated at a primary voltage of about 100 keV in pulses of 1 ampere current through the window and 25 microsecond pulse duration. The average energy of the injected electron beam energy after passing through the foil was about 45 keV.

In three separate experiments, contaminated air with an initial contaminant concentration of 118 parts per million was introduced into the cell 56. This concentration is representative of the concentration found in the stack gases of fossil-fired power plants. The cell was operated in a batch fashion. That is, the cell was not operated in a continuous flowing mode, but with the contents sealed into the chamber so that the effect of the electron beam pulses could be assessed. The contaminants in the three experiments were, respectively, benzene, acetone, and 1,1,1 trichloroethane.

The experiments were conducted by applying a number of electron beam pulses to the contaminated air in the cell, then discontinuing the electron irradiation so that the concentration of contaminant could be measured by the mass analyzer 92. After the contaminant content was measured, pulsed irradiation was resumed.

Figure 4:
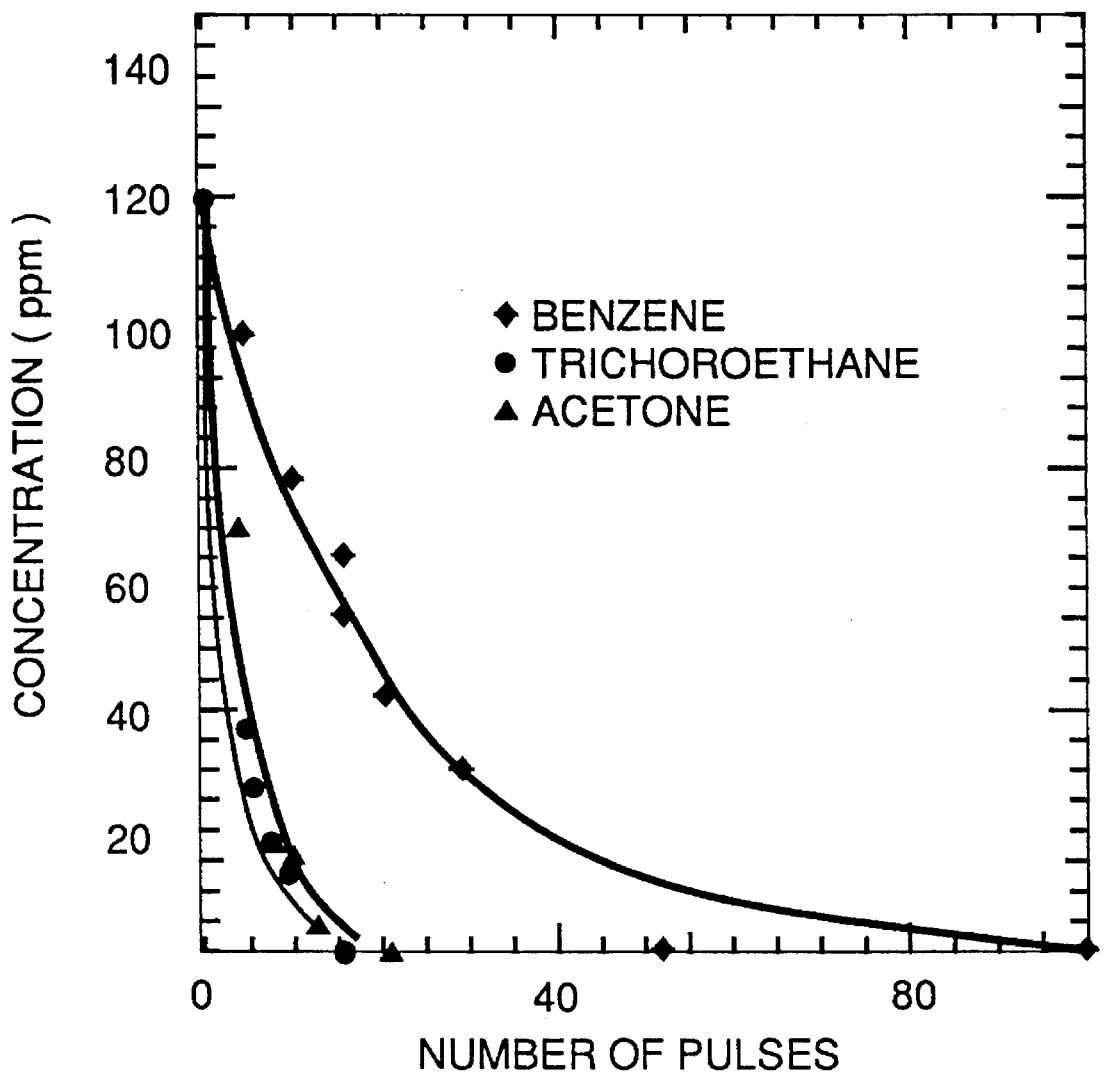
FIG. 4 is a graph of contaminant concentration as a function of number of low-energy electron beam pulses.

FIG. 4 shows the change in concentration of the contaminants as a function of the number of pulses. The contaminant contents are reduced below the limit of detection, about 5 ppm, in from 15 to 100 pulses, depending upon the contaminant. This result demonstrates the operability of the invention, and also suggests that a continuous flow process would be operable as long as the mean residence time of the contaminated gas within the apparatus permits each volume of gas to receive the required number of pulses.

The present invention provides an advance in the art of contaminant reduction from fluids and gases. Although a particular embodiment of the invention has been described in detail for purposes of illustration, various modifications may be made without departing from the spirit and scope of the invention. Accordingly, the invention is not to be limited except as by the appended claims.

What is claimed is:

1. A method for reducing contaminants in a fluid, comprising the steps of:

providing a fluid containing a contaminant compound;

producing a beam of electrons;

directing the beam of electrons through the fluid to reduce the concentration of the contaminant compound in the fluid, the electrons of the beam having an average injected energy of from about 45 to about 55 thousand electron volts upon entering the fluid.

2. The method of claim 1, wherein the step of providing a fluid comprises thee step of providing air containing a contaminant compound.

3. The method of claim 1, wherein the step of providing a fluid comprises the step of providing air containing a contaminant compound selected from the group consisting of a hydrocarbon, $NO_x$, and $SO_x$.

4. The method of claim 1, wherein the step of providing a fluid comprises the step of providing water containing a contaminant compound.

5. The method of claim 1, wherein the step of providing a fluid comprises the step of providing water containing a contaminant compound selected from the group consisting of polychlorinated biphenyl compounds, halogenated organic compounds, and mixtures thereof.

6. The method of claim 1, wherein the step of producing a beam of electrons comprises the step of pulsing an electron beam between an off-state and an on-state.

7. The method of claim 1, wherein the step of producing a beam of electrons comprises the step of pulsing an electron beam between an off-state and an on-state with a pulse duration of from about 5 microseconds to about 50 microseconds.

8. A method for reducing contaminants in a fluid, comprising the steps of:

providing a fluid containing a contaminant compound;

producing a beam of electrons, the electrons of the beam having an average primary energy of from about 90 to about 110 thousand electron volts;

passing the beam of electrons through an electron transmissive window; and directing the beam of electrons through the fluid after passing through the window having an average energy of from about 45 to 55 thousand electron volts upon entering the fluid, thereby reducing the concentration of the contaminant compound in the fluid.

9. The method of claim 8, wherein the step of providing a fluid comprises the step of providing air containing a contaminant compound.

10. The method of claim 8, wherein the step of providing a fluid comprises the step of providing water containing a contaminant compound.

11. The method of claim 8, wherein the step of producing a beam of electrons comprises the step, of pulsing an electron beam between an off-state and an on-state.

12. The method of claim 8, wherein the step of passing the beam through an electron transmissive window includes the step of providing an electron transmissive window having a composition and thickness such that the electrons passed through the window and entering the fluid have an average energy of at least about 45 thousand electron volts.

13. A method for reducing contaminants in a fluid, comprising the steps of:

providing an apparatus comprising an electron beam source of a beam of electrons with the electrons having an average primary energy of from about 90 to about 110 thousand electron volts, a contaminant-reduction cell, and an electron-beam transmissive window between the electron beam source and the cell, the window being selected such that the average energy of the electrons is from about 45 to about 55 thousand electron volts after passing through the window;

producing an electron beam with the apparatus;

introducing a fluid containing a contaminant compound into the cell; and passing the electron beam from the source, through the window, and into the cell containing the contaminant compound.

14. The method of claim 13, wherein the step of providing a fluid comprises the step of providing air containing a contaminant compound.

15. The method of claim 13, wherein the step of providing a fluid comprises the step of providing air containing a contaminant compound selected from the group consisting of a hydrocarbon, $NO_x$, and $SO_x$.

16. The method of claim 13, wherein the step of providing a fluid comprises the step of providing water containing a contaminant compound.

17. The method of claim 19, wherein the step of providing a fluid comprises the step of providing water containing a contaminant compound selected from the group consisting of polychlorinated biphenyl compounds, halogenated organic compounds, and mixtures thereof.

18. The method of claim 13, wherein the step of producing an electron beam comprises the step of pulsing an electron beam between an off-state and an on-state.

19. The method of claim 13, wherein the step of producing an electron beam comprises the step of pulsing an electron beam between an off-state and an on-state with a pulse-duration of from about 5 microseconds to about 50 microseconds.

20. The method of claim 13, wherein the step of providing an apparatus includes the step of providing a titanium window about 13 micrometers thick.

* * * * *